US012614801B2

(12) United States Patent
Kim et al.

(10) Patent No.: US 12,614,801 B2
(45) Date of Patent: Apr. 28, 2026

(54) BATTERY MODULE HAVING STRUCTURE CAPABLE OF ABSORBING SWELLING, AND BATTERY PACK AND VEHICLE COMPRISING SAME

(71) Applicant: LG ENERGY SOLUTION, LTD., Seoul (KR)

(72) Inventors: Dong-Wook Kim, Daejeon (KR); Jae-Yeong Kim, Daejeon (KR); Gi-Young Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 591 days.

(21) Appl. No.: 18/032,143

(22) PCT Filed: Dec. 24, 2021

(86) PCT No.: PCT/KR2021/019893
§ 371 (c)(1),
(2) Date: Apr. 14, 2023

(87) PCT Pub. No.: WO2022/145909
PCT Pub. Date: Jul. 7, 2022

(65) Prior Publication Data
US 2023/0395917 A1     Dec. 7, 2023

(30) Foreign Application Priority Data

Dec. 29, 2020     (KR) ........................ 10-2020-0186475

(51) Int. Cl.
*H01M 50/264*     (2021.01)
*H01M 50/211*     (2021.01)
(Continued)

(52) U.S. Cl.
CPC ....... *H01M 50/242* (2021.01); *H01M 50/211* (2021.01); *H01M 50/264* (2021.01);
(Continued)

(58) Field of Classification Search
CPC ........... H01M 10/0481; H01M 50/242; H01M 50/262; H01M 50/264
See application file for complete search history.

(56) References Cited

U.S. PATENT DOCUMENTS

| | | |
|---|---|---|
| 2004/0021442 A1 | 2/2004 | Higashino |
| 2006/0115719 A1 | 6/2006 | Jeon et al. |

(Continued)

FOREIGN PATENT DOCUMENTS

| | | |
|---|---|---|
| CN | 102754239 A | 10/2012 |
| CN | 103594745 A | 2/2014 |

(Continued)

*Primary Examiner* — Kevin E Yoon
(74) *Attorney, Agent, or Firm* — Bryan Cave Leighton Paisner LLP

(57) ABSTRACT

A battery module including: a cell stack including a plurality of battery cells; a first end plate and a second end plate covering a top surface and a bottom surface of the cell stack, respectively; a first upper reinforcing plate and a second upper reinforcing plate located on the first end plate and extending from both sides of the first end plate toward a central portion; a first lower reinforcing plate and a second lower reinforcing plate located on the second end plate and extending from both sides of the second end plate toward a central portion; a first fastening bolt passing through the first upper reinforcing plate, the first and second end plates, and the first lower reinforcing plate; and a second fastening bolt passing through the second upper reinforcing plate, the first and second end plates, and the second lower reinforcing plate.

13 Claims, 4 Drawing Sheets

(51) Int. Cl.
　　*H01M 50/242*　　　(2021.01)
　　*H01M 50/507*　　　(2021.01)
(52) U.S. Cl.
　　CPC ...... *H01M 50/507* (2021.01); *H01M 2200/20*
　　　　　　　(2013.01); *H01M 2220/20* (2013.01)
(56)　　　　　　References Cited

U.S. PATENT DOCUMENTS

| | | | |
|---|---|---|---|
| 2007/0026305 | A1 | 2/2007 | Jeon et al. |
| 2012/0328925 | A1 | 12/2012 | Choo et al. |
| 2013/0022848 | A1 | 1/2013 | Schroeter et al. |
| 2013/0136963 | A1 | 5/2013 | Chiba |
| 2013/0341107 | A1 | 12/2013 | Choo et al. |
| 2017/0133706 | A1 | 5/2017 | Ejima |
| 2017/0214009 | A1* | 7/2017 | Ha ...................... H01M 50/264 |
| 2020/0343498 | A1 | 10/2020 | Schuessler et al. |
| 2020/0350538 | A1* | 11/2020 | Jeon ...................... H01M 50/24 |
| 2021/0376418 | A1 | 12/2021 | Terauchi |

FOREIGN PATENT DOCUMENTS

| | | | |
|---|---|---|---|
| CN | 204407383 | | 6/2015 |
| CN | 204407383 | U | 6/2015 |
| CN | 111834571 | A | 10/2020 |
| EP | 1523051 | | 4/2005 |
| JP | 2013-524404 | A | 6/2013 |
| JP | 5481796 | B2 | 4/2014 |
| JP | 2020047522 | | 3/2020 |
| KR | 10-2006-0060800 | A | 6/2006 |
| KR | 10-0590049 | B1 | 6/2006 |
| KR | 10-2007-0014653 | A | 2/2007 |
| KR | 10-1104151 | B1 | 1/2012 |
| KR | 10-2013-0123762 | A | 11/2013 |
| KR | 10-1806995 | B1 | 12/2017 |
| KR | 10-2019-0110349 | A | 9/2019 |
| WO | 2016166972 | | 10/2016 |
| WO | 2019187314 | | 10/2019 |

* cited by examiner

BATTERY MODULE HAVING STRUCTURE CAPABLE OF ABSORBING SWELLING, AND BATTERY PACK AND VEHICLE COMPRISING SAME

CROSS-REFERENCE TO RELATED APPLICATIONS

The present application is a US national phase of international Application No. PCT/KR2021/019893 filed on Dec. 24, 2021, and claims priority to Korean Patent Application No. 10-2020-0186475 filed on Dec. 29, 2020, the disclosures of which are incorporated by reference, as if fully set forth herein.

TECHNICAL FIELD

The present disclosure relates to a battery module having a structure capable of absorbing swelling and a battery pack and a vehicle including the battery module, and more particularly, to a battery module having a structure capable of effectively absorbing swelling of a battery cell by increasing the resistance of an end plate against bending deformation without increasing a thickness of the end plate.

BACKGROUND

In a conventional battery module as shown in FIG. 1, a pair of end plates 4 located on both sides of a cell stack 3 including a plurality of battery cells 1, respectively, and swelling absorbing pads 2 located in a stacked direction of the cell stack 3, and the pair of end plates 4 are fixed to each other by a fastening bolt 5.

In this battery module structure, the pair of end plates 4 constrain deformation due to swelling of the battery cell 3. The swelling absorbing pads 2 are located at an outermost portion of the cell stack 3 and/or between adjacent battery cells 1 to primarily absorb deformation due to swelling of the plurality of battery cells 1.

Also, when the swelling exceeds a level at which the swelling absorbing pads 2 may absorb any deformation, volume expansion of the battery cells 1 is limited by the end plates 4. The end plates 4 should have appropriate stiffness so that the end plates 4 do not excessively constrain swelling. To this end, a swelling test of the battery cells 1 according to repeated charging and discharging should be performed, and a verification procedure should be performed to prevent structural damage to the battery module based on a result of the test.

As the number of charge and discharge cycles increases, a swelling force applied to the module may gradually increase, and thus, the performance of the battery cells 1 may degrade and a lifetime of the battery cells 1 may also be reduced. In each of the battery cells 1, a separator in the battery cell 1 may be partially compressed when a large swelling force is locally applied, thereby degrading the performance of the respective battery cell 1. In contrast, when a pressing force is too weak, a problem may occur due to generation of gas in the battery cell 1.

In the conventional battery module, when a thickness of the end plates 4 is reduced for weight reduction, bending stiffness of each of the end plates 4 is not sufficient, and thus, intense bending deformation occurs in a portion of the respective end plate 4 corresponding to a central portion of the battery cells 1 due to a swelling force. Due to this partial deformation of the end plates 4, pressure deviation with respect to a plurality of battery cells 1 constituting the cell stack 3 and pressure deviation according to a position of one battery cell 1 increase, thereby leading to performance degradation of the battery module.

Accordingly, there is a demand to develop a battery module capable of applying a uniform force to the entire cell stack 3 when swelling of the battery cell 1 occurs.

SUMMARY

The present disclosure is designed to solve the problems of the related art, and therefore the present disclosure is directed to applying uniform pressure to a battery cell by reducing the amount of bending deformation of an end plate due to swelling without increasing a thickness of the end plate.

Also, the present disclosure is directed to preventing pressure applied to a battery cell from excessively increasing due to a reduction in the amount of bending deformation of an end plate.

However, the technical purpose to be solved by the present disclosure is not limited to the above, and other objectives not mentioned herein will be clearly understood by one of ordinary skill in the art from the following disclosure.

In one exemplary aspect of the present disclosure, there is provided a battery module including: a cell stack including a plurality of battery cells; a first end plate and a second end plate respectively covering a top surface and a bottom surface of the cell stack; a first upper reinforcing plate and a second upper reinforcing plate located on the first end plate and respectively extending from each of two sides of the first end plate in a longitudinal direction of the first end plate toward a central portion; a first lower reinforcing plate and a second lower reinforcing plate located on the second end plate and respectively extending from each of two sides of the second end plate in a longitudinal direction of the second end plate toward a central portion; a first fastening bolt located on a side of the cell stack in a longitudinal direction of the cell stack, and passing through the first upper reinforcing plate, the first end plate, the second end plate, and the first lower reinforcing plate; and a second fastening bolt located on the other side of the cell stack in the longitudinal direction of the cell stack, and passing through the second upper reinforcing plate, the first end plate, the second end plate, and the second lower reinforcing plate.

The first upper reinforcing plate and the second upper reinforcing plate may extend toward each other but may be spaced apart from each other, and the first lower reinforcing plate and the second lower reinforcing plate may extend toward each other but may be spaced apart from each other.

A pair of first fastening bolts and a pair of second fastening bolts may be respectively provided on one end portion and the other end portion of the battery module in a width direction of the battery module.

A pair of first upper reinforcing plates and a pair of first lower reinforcing plates may be respectively provided on one end portion and the other end portion of the battery module in the width direction of the battery module, and a pair of second upper reinforcing plates and a pair of second lower reinforcing plates may be respectively provided on one end portion and the other end portion of the battery module in the width direction of the battery module.

The first upper reinforcing plate and the first lower reinforcing plate may be respectively fastened to the upper end plate and the lower end plate by a pair of first fastening bolts, and the second upper reinforcing plate and the second lower reinforcing plate may be respectively fastened to the upper end plate and the lower end plate by a pair of second fastening bolts.

Each of the first fastening bolt and the second fastening bolt may include an upper bolt and a lower bolt that are spaced apart from each other, wherein the battery module further includes a pressure relief coupler connecting the upper bolt to the lower bolt.

The pressure relief coupler may include: a first main hinge coupled to the upper bolt; a second main hinge coupled to the lower bolt; and a first connection bar fastened between the first main hinge and the second main hinge.

The pressure relief coupler may further include a pair of first sub-connection bar assemblies provided on one side and the other side of the first connection bar, and hinged to the first main hinge and the second main hinge.

Each of the pair of first sub-connection bar assemblies may include: a pair of first sub-connection bars respectively hinged to the first main hinge and the second main hinge; and a first sub-hinge hinged between the pair of first sub-connection bars.

A sum of lengths of the pair of first sub-connection bars may be greater than a length of the first connection bar.

The pressure relief coupler may further include a pair of second sub-connection bar assemblies provided on one side and the other side of the first connection bar, located on an outer side the first sub-connection bar assembly, and hinged to the first main hinge and the second main hinge.

Each of the pair of second sub-connection bar assemblies may include: a pair of second sub-connection bars respectively hinged to the first main hinge and the second main hinge; and a second sub-hinge hinged between the pair of second sub-connection bars.

A sum of lengths of the pair of second sub-connection bars may be greater than a sum of lengths of the pair of first sub-connection bars.

In another aspect of the present disclosure, there are also provided a battery pack and a vehicle including the battery module according to an exemplary embodiment of the present disclosure.

According to an exemplary aspect of the present disclosure, uniform pressure may be applied to a cell stack by reducing the amount of bending deformation of an end plate due to swelling without increasing a thickness of the end plate.

Also, according to another aspect of the present disclosure, pressure applied to a cell stack may be prevented from excessively increasing due to a reduction in the amount of bending deformation of an end plate.

BRIEF DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

DETAILED DESCRIPTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
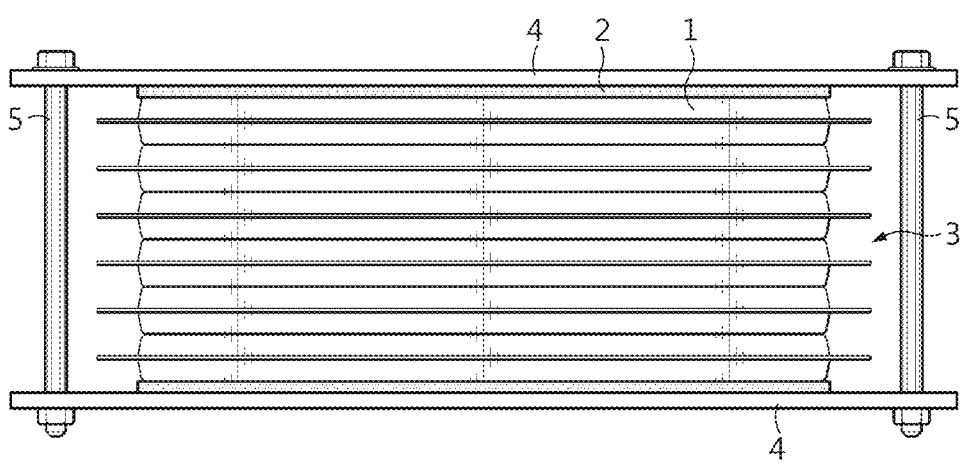
FIG. 1 is an illustration of a conventional battery module.
Figure 2:
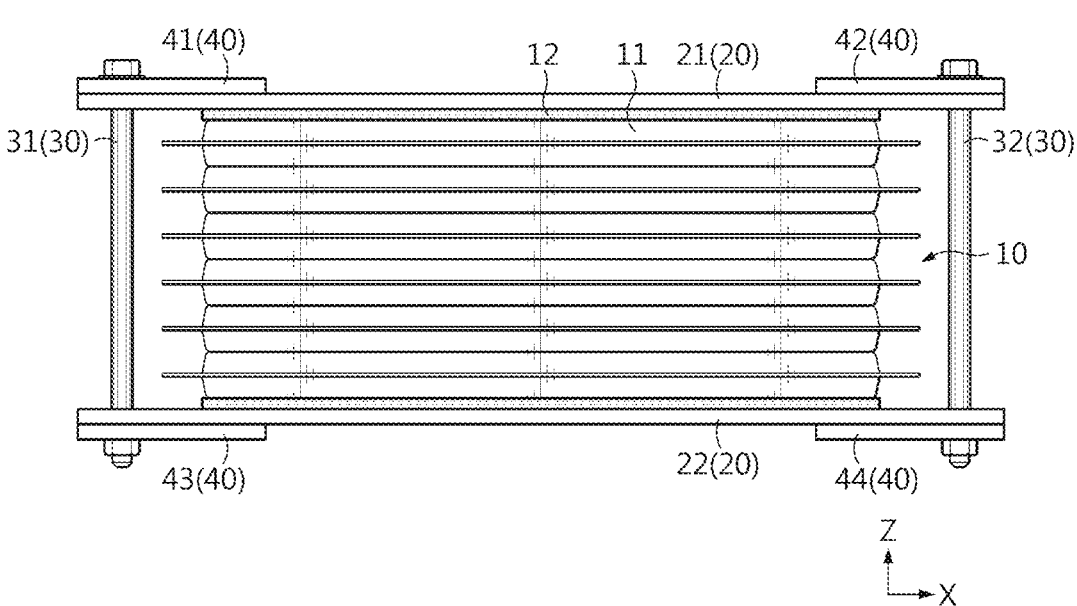
FIG. 2 is a side view of a battery module according to an exemplary embodiment of the present disclosure.

As illustrated in FIG. 2, a battery module according to an exemplary embodiment of the present disclosure includes a cell stack 10, an end plate 20, a reinforcing plate 40, and a fastening bolt 30.

The cell stack 10 includes a plurality of battery cells 11. For example, a pouch-type battery cell may be used as the battery cell 11. Although not shown in FIG. 2, each of the battery cells 11 includes a pair of electrode leads (not shown) extending to the outside of the battery cell 11 in a longitudinal direction (direction parallel to an X-axis) of the battery cell 11. The pair of electrode leads may be drawn in the same direction or opposite directions. The plurality of battery cells 11 are stacked in a vertical direction (direction parallel to a Z-axis).

The cell stack 10 may further include swelling absorbing pads 12 located between adjacent battery cells 11 and/or located at an outermost position in a stacked direction (direction parallel to the Z-axis) of the cell stack 10. The swelling absorbing pads 12 may be compressed during swelling of the battery cells 11 due to repeated charging and discharging to absorb volume expansion of the battery cells 11.

The end plate 20 includes a first end plate 21 covering a top surface of the cell stack and a second end plate 22 covering a bottom surface of the cell stack 10. The first end plate 21 and the second end plate 22 have areas corresponding to each other. The first end plate 21 and the second end plate 22 have areas greater than that of the cell stack 10 to facilitate coupling using the fastening bolt 30.

Each of the first end plate 21 and the second end plate 22 has sufficient stiffness to protect the cell stack 10 from external impact and suppress volume expansion due to swelling. Each of the first end plate 21 and the second end plate 22 may be formed of a metal material by considering such functions.

The reinforcing plate 40 includes a first upper reinforcing plate 41 and a second upper reinforcing plate 42 located on the first end plate 21, and a first lower reinforcing plate 43 and a second lower reinforcing plate 44 located on the second end plate 22.

The first upper reinforcing plate 41 extends from one side of the first end plate 21 in a longitudinal direction (parallel to the X-axis) of the first end plate 21 toward a central portion. The second upper reinforcing plate 42 extends from the other side of the first end plate 21 in the longitudinal direction of the first end plate 21 toward the central portion.

The first upper reinforcing plate 41 and the second upper reinforcing plate 42 extend toward each other but are spaced apart from each other.

The first lower reinforcing plate 43 extends from one side of the second end plate 22 in a longitudinal direction (direction parallel to the X-axis) of the second end plate 22 toward a central portion. The second lower reinforcing plate 44 extends from the other side of the second end plate 22 in the longitudinal direction of the second end plate 22 toward the central portion. The first lower reinforcing plate 43 and the second lower reinforcing plate 44 extend toward each other but are spaced apart from each other.

When the battery cells 11 swell, a portion where intense volume expansion occurs is a central portion of the battery cells 11 in the longitudinal direction (direction parallel to the X-axis). Accordingly, each of the upper end plate 21 and the lower end plate 22 is subjected to intense pressure at a central portion in the longitudinal direction (direction parallel to the X-axis).

The first upper reinforcing plate 41 and the second upper reinforcing plate 42 partially reinforce stiffness of the upper end plate 21, and thus, a strain of the upper end plate 21 due to swelling pressure is reduced. Likewise, the first lower reinforcing plate 43 and the second lower reinforcing plate 44 partially reinforce stiffness of the lower end plate 22, and thus, a strain of the lower end plate 22 due to swelling pressure is reduced.

Because the first upper reinforcing plate 41 and the second upper reinforcing plate 42 partially reinforce the upper end plate 21, bending stiffness of the upper end plate 21 may be effectively reinforced without significantly increasing a weight of the battery module. Also, because the first upper reinforcing plate 41 and the second upper reinforcing plate 42 are spaced apart from each other without being connected to each other, excessive suppression of volume expansion due to swelling may be prevented. Likewise, because the first lower reinforcing plate 43 and the second lower reinforcing plate 44 partially reinforce the lower end plate 22, bending stiffness of the lower end plate 22 may be effectively reinforced without significantly increasing a weight of the battery module. Also, because the first lower reinforcing plate 43 and the second lower reinforcing plate 44 are spaced apart from each other without being connected to each other, excessive suppression of volume expansion due to swelling may be prevented.

The fastening bolt 30 includes a first fastening bolt 31 located on one side of the cell stack 10 in a longitudinal direction (direction parallel to the X-axis) of the cell stack 10 and a second fastening bolt 32 located on the other side of the cell stack 10 in the longitudinal direction of the cell stack 10.

The first fastening bolt 31 passes through an end portion of each of the first upper reinforcing plate 41, the first end plate 21, the second end plate 22, and the first lower reinforcing plate 43 in a direction perpendicular to the X-axis[SD1]. Due to the first fastening bolt 31, the upper end plate 21 and the lower end plate 22 are closely fixed to the cell stack 10. Due to the first fastening bolt 31, the first upper reinforcing plate 41 and the second lower reinforcing plate 43 are respectively closely fixed to the upper end plate 21 and the lower end plate 22.

The second fastening bolt 32 passes through the other end portion of each of the second upper reinforcing plate 42, the first end plate 21, the second end plate 2, and the second lower reinforcing plate 44 in a direction perpendicular to the X-axis[SD2]. Due to the second fastening bolt 32, the upper end plate 21 and the lower end plate 22 are closely fixed to the cell stack 10. Due to the second fastening bolt 32, the second upper reinforcing plate 42 and the second lower reinforcing plate 44 are respectively closely fixed to the upper end plate 21 and the lower end plate 22.

Figure 3:
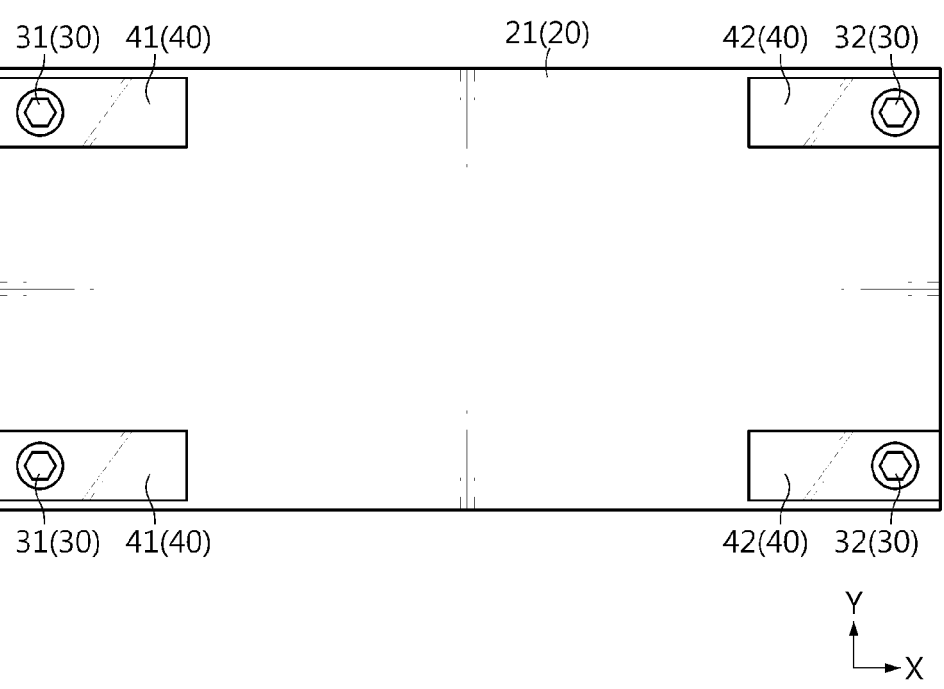
FIGS. 3 and 4 are plan views of the battery module of FIG. 2.

As illustrated in FIGS. 2 and 3, a pair of first fastening bolts 31 and a pair of second fastening bolts 32 may be respectively provided on one end portion and the other end portion of the battery module in a width direction (direction parallel to a Y-axis) of the battery module. In this case, a pair of first upper reinforcing plates 41 and a pair of first lower reinforcing plates 43 may be respectively provided on one end portion and the other end portion of the battery module in the width direction of the battery module. Likewise, a pair of second upper reinforcing plates 42 and a pair of second lower reinforcing plates 44 may be respectively provided on an end portion and the other end portion of the battery module in the width direction of the battery module.

Figure 4:
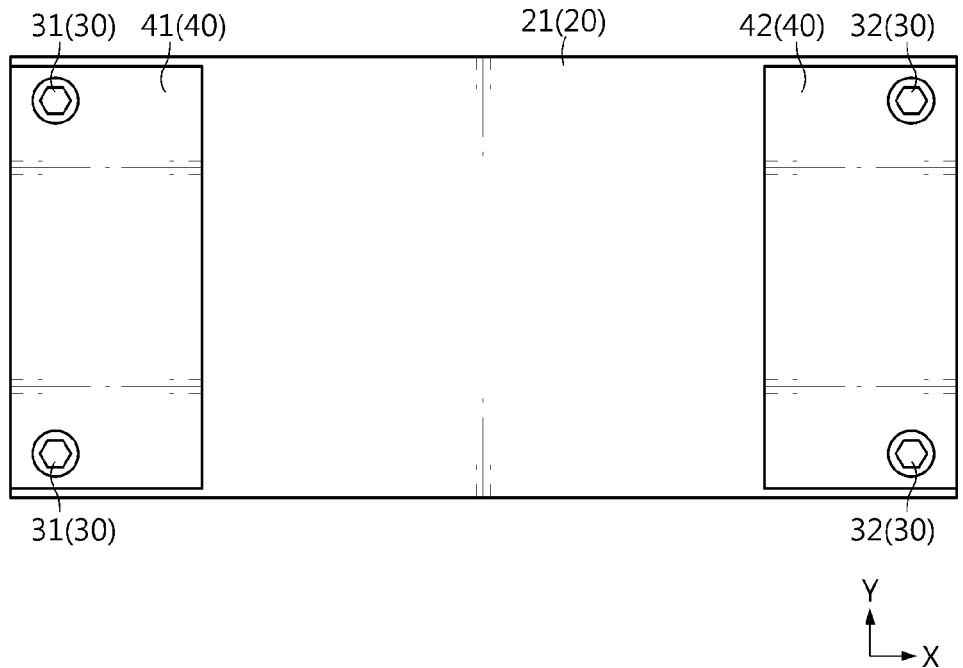

As illustrated in FIGS. 2 and 4, unlike in FIG. 3, one of the pair of first upper reinforcing plates 41 and one of the pair of first lower reinforcing plates 43 may be provided on one end portion of the battery module in a longitudinal direction of the battery module. In this case, each of the first upper reinforcing plate 41 and the first lower reinforcing plate 43 extends from one end portion toward the other end portion of the battery module in a width direction of the battery module, and the upper end plate 21 and the lower end plate 22 are fastened by a pair of first fastening bolts 31.

Likewise, one of the pair of second upper reinforcing plates 42 and one of the pair of second lower reinforcing plates 44 may be provided on the other end portion of the battery module in the longitudinal direction of the battery module. In this case, each of the second upper reinforcing plate 42 and the second lower reinforcing plate 44 extends from one end portion toward the other end portion of the battery module in the width direction of the battery module, and the upper end plate 21 and the lower end plate 22 are fastened by a pair of second fastening bolts 32.

Figure 5:
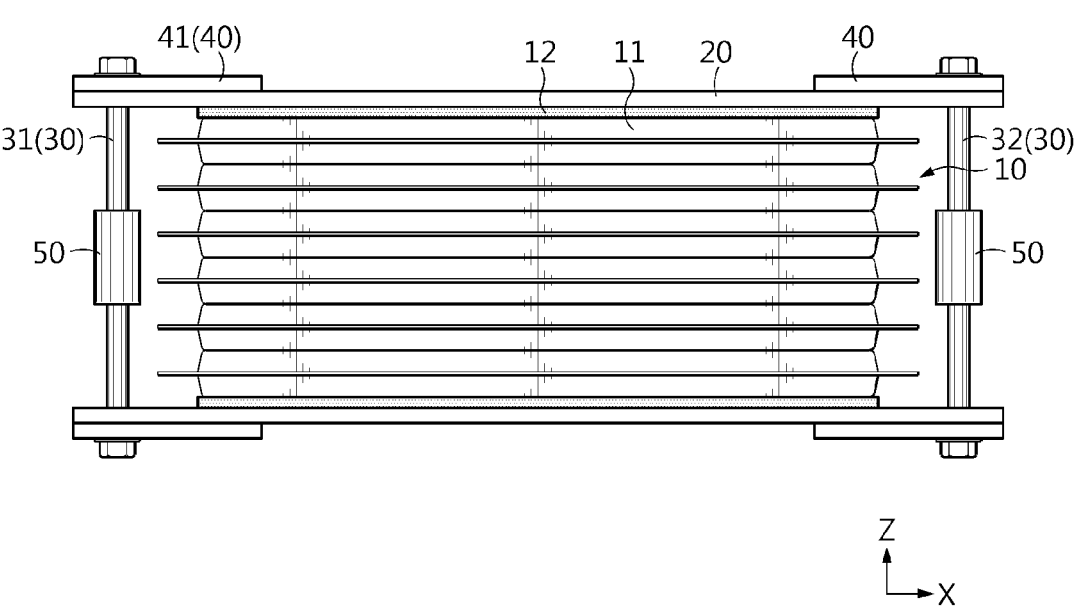
FIG. 5 is a side view of a battery module according to another exemplary embodiment of the present disclosure.
Figure 6:
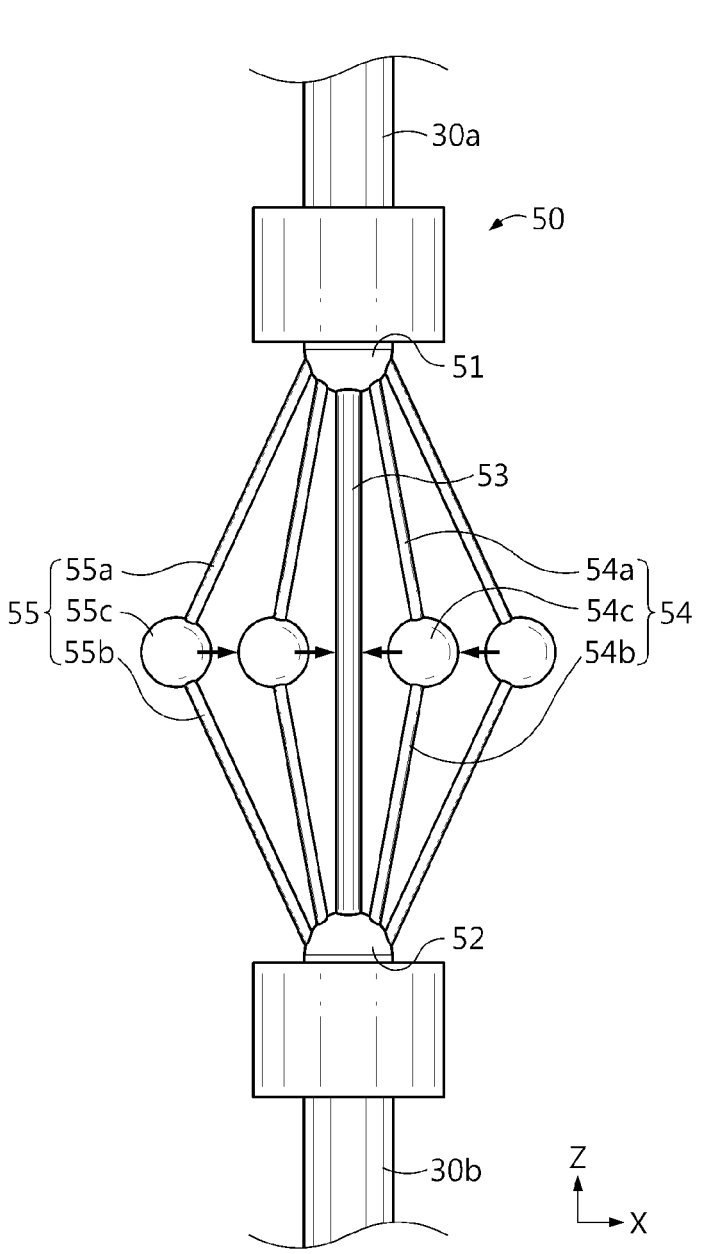
FIG. 6 is an illustration of a pressure relief coupler applied to a battery module according to another exemplary embodiment of the present disclosure.

As illustrated in FIGS. 5 and 6, each of the first fastening bolt 31 and the second fastening bolt 32 may include an upper bolt 30a and a lower bolt 30b that are spaced apart from each other. Each of the first fastening bolt 31 and the second fastening bolt 32 may further include a pressure relief coupler 50 that connects the upper bolt 30a to the lower bolt 30b.

The pressure relief coupler 50 includes a first main hinge 51 coupled to the upper bolt 30a, a second main hinge 52 coupled to the lower bolt 30b, and a first connection bar 53 fastened between the first main hinge 51 and the second main hinge 52. The first connection bar 53 prevents pressure applied to the battery cells 11 from excessively increasing due to the end plate 20 whose bending stiffness is increased according to the application of the reinforcing plate 40.

To perform this function, the first connection bar 53 has a bar shape having a smaller thickness than the upper bolt 30a and the lower bolt 30b constituting the fastening bolt 30. The upper bolt 30a and the lower bolt 30b, and the first connection bar 53 are all formed of a metal material. The upper bolt 30a and the lower bolt 30b having a relative large thickness hardly elongate even when a force in a vertical direction (direction parallel to the Z-axis) is applied to the end plate 20 due to swelling pressure. In contrast, when a large force is applied to the end plate 20, the first connection bar 53 having a relatively small thickness may elongate by a certain length to reduce pressure applied to the cell stack 10. When pressure applied to the cell stack 10 is too high, pores of a separator in each of the battery cells 11 may be blocked, and thus, the performance of the battery cells 11 may be degraded. The pressure relief coupler 50 corresponds to an element applied to prevent performance degradation of the battery cells 11.

The pressure relief coupler 50 may further include at least a pair of first sub-connection bar assemblies 54 provided on two sides of the first connection bar 53 and hinged to the first main hinge 51 and the second main hinge 52.

The first sub-connection bar assembly 54 includes a pair of first sub-connection bars 54a, 54b respectively hinged to the first main hinge 51 and the second main hinge 52, and a first sub-hinge 54c hinged between the pair of first sub-connection bars 54a, 54b.

Each of the pair of first sub-connection bars 54a, 54b is formed of a metal material, and has a smaller thickness than the upper bolt 30a and the lower bolt 30b. A sum of lengths of the pair of first sub-connection bars 54a, 54b is greater than a length of the first connection bar 53. Accordingly, as the first connection bar 53 elongates according to an increase in swelling pressure, the first sub-hinge 54c moves toward the first connection bar 53 in an arrow direction of FIG. 6. When the first sub-hinge 54c reaches a position where the first sub-hinge 54c may no longer move, a tensile force according to swelling pressure is applied to the first sub-connection bars 54a, 564b, and thus, the first sub-connection bars 54a, 54b elongate along with the first connection bar 53, thereby reducing swelling pressure.

The pressure relief coupler 50 may further include at least a pair of second sub-connection bar assemblies 55 provided on two sides of the first connection bar 53 and located on an outer side of the first sub-connection bar assembly 54. The pair of second sub-connection bar assemblies 55 are hinged to the first main hinge 51 and the second main hinge 52.

The second sub-connection bar assembly 55 includes a pair of second sub-connection bars 55a, 55b respectively hinged to the first main hinge 51 and the second main hinge 52, and a second sub-hinge 55c hinged between the pair of second sub-connection bars 55a, 55b.

Each of the pair of second sub-connection bars 55a, 55b is formed of a metal material, and has a smaller thickness than the upper bolt 30a and the lower bolt 30b. A sum of lengths of the pair of second sub-connection bars 55a, 55b is greater than a sum of lengths of the pair of first sub-connection bars 54a, 54b. Accordingly, as the first sub-connection bars 54a, 54b elongate according to an increase in swelling pressure, the second sub-hinge 55c moves toward the first sub-connection bar assembly 54 in an arrow direction of FIG. 6. When the second sub-hinge 55c reaches a position where the second sub-hinge 55c may no longer move, a tensile force according to swelling pressure is applied to the second sub-connection bars 55a, 55b, and thus, the second sub-connection bars 55a, 55b elongate along with the first connection bar 53 and the first sub-connection bars 54a, 54b, thereby reducing swelling pressure.

Although a case where the battery module according to an exemplary embodiment of the present disclosure includes the first sub-connection bar assembly 54 and a case where the battery module includes the first sub-connection bar assembly 54 and the second sub-connection bar assembly 55 are shown in the drawings, the present disclosure is not limited thereto. That is, the battery module according to an exemplary embodiment of the present disclosure may further include an additional sub-connection bar assembly in addition to the first sub-connection bar assembly 54 and the second sub-connection bar assembly 55.

A battery pack according to an exemplary embodiment of the present disclosure includes the battery module according to an exemplary embodiment of the present disclosure as described above. Also, a vehicle according to an exemplary embodiment of the present disclosure includes the battery module according to an exemplary embodiment of the present disclosure as described above.

Although the embodiments of the present disclosure have been illustrated and described above, the present disclosure is not limited to the above-described specific embodiments. Various modified embodiments may be made by one of ordinary skill in the art without departing from the scope of the present disclosure as claimed in the claims.

What is claimed is:

1. A battery module comprising:
a cell stack comprising a plurality of battery cells;
a first end plate and a second end plate covering a top surface and a bottom surface, respectively, of the cell stack;
at least one first upper reinforcing plate and at least one second upper reinforcing plate located on the first end plate and extending from a first side and a second side of the first end plate, respectively, in a longitudinal direction of the first end plate toward a central portion of the first end plate;
at least one first lower reinforcing plate and at least one second lower reinforcing plate located on the second end plate and extending from a first side and a second side of the second end plate, respectively, in a longitudinal direction of the second end plate toward a central portion of the second end plate;
a first fastening bolt located on a first side of the cell stack in a longitudinal direction of the cell stack, and passing through the at least one first upper reinforcing plate, the first end plate, the second end plate, and the at least one first lower reinforcing plate; and
a second fastening bolt located on a second side of the cell stack in the longitudinal direction of the cell stack, and passing through the at least one second upper reinforcing plate, the first end plate, the second end plate, and the at least one second lower reinforcing plate wherein each of the first fastening bolt and the second fastening bolt comprises an upper bolt and a lower bolt that are spaced apart from each other, wherein the battery module further comprises a pressure relief coupler connecting the upper bolt to the lower bolt of each of the first fastening bolt and the second fastening bolt, wherein the pressure relief coupler comprises: a first main hinge coupled to the upper bolt; a second main hinge coupled to the lower bolt; and a first connection bar fastened between the first main hinge and the second main hinge.

2. The battery module according to claim 1, wherein the at least one first upper reinforcing plate and the at least one second upper reinforcing plate extend toward each other and are spaced apart from each other, and
the at least one first lower reinforcing plate and the at least one second lower reinforcing plate extend toward each other and are spaced apart from each other.

3. The battery module according to claim 1, wherein a pair of first fastening bolts and a pair of second fastening bolts are provided on a first end portion and a second end portion, respectively, of the battery module in a width direction of the battery module.

4. The battery module according to claim 3, wherein a pair of first upper reinforcing plates and a pair of first lower reinforcing plates are provided on the first end portion and the second other end portion, respectively, of the battery module in the width direction of the battery module, and wherein a pair of second upper reinforcing plates and a pair of second lower reinforcing plates are provided on the first end portion and the second end portion, respectively, of the battery module in the width direction of the battery module.

5. The battery module according to claim 3, wherein the first upper reinforcing plate and the first lower reinforcing plate are fastened to the upper end plate and the lower end plate, respectively, by the pair of first fastening bolts, and wherein the second upper reinforcing plate and the second lower reinforcing plate are fastened to the upper end plate and the lower end plate, respectively, by the pair of second fastening bolts.

6. The battery module according to claim 1, wherein the pressure relief coupler further comprises a pair of first sub-connection bar assemblies provided on a first side and a second side of the first connection bar, respectively, and wherein the pair of first sub-connection bar assemblies are connected to the first main hinge and the second main hinge.

7. The battery module according to claim 6, wherein each of the pair of first sub-connection bar assemblies comprises:

a pair of first sub-connection bars connected to the first main hinge and the second main hinge, respectively; and a first sub-hinge connecting the pair of first sub-connection bars.

8. The battery module according to claim 7, wherein a sum of lengths of the pair of first sub-connection bars is greater than a length of the first connection bar.

9. The battery module according to claim 8, wherein the pressure relief coupler further comprises a pair of second sub-connection bar assemblies provided on a first side and a second side of the first connection bar, located on an outer side of the first sub-connection bar assembly, and connected to the first main hinge and the second main hinge.

10. The battery module according to claim 9, wherein each of the pair of second sub-connection bar assemblies comprises:

a pair of second sub-connection bars connected to the first main hinge and the second main hinge, respectively; and a second sub-hinge hinged between the pair of second sub-connection bars.

11. The battery module according to claim 10, wherein a sum of lengths of the pair of second sub-connection bars is greater than a sum of lengths of the pair of first sub-connection bars.

12. A battery pack comprising the battery module according to claim 1.

13. A vehicle comprising the battery module according to claim 1.

* * * * *